United States Patent [19]

Anstis

[11] 4,322,997

[45] Apr. 6, 1982

[54] KEYBOARD

[75] Inventor: Lawrence G. Anstis, Albury, Australia

[73] Assignee: Dorothy Isobel Anstis, New South Wales, Australia; a part interest

[21] Appl. No.: 134,926

[22] Filed: Mar. 28, 1980

[30] Foreign Application Priority Data

Mar. 30, 1979 [AU] Australia ............................ PD8255

[51] Int. Cl.³ ........................ G09B 15/08; G10C 3/12

[52] U.S. Cl. .................................................. 84/479 A

[58] Field of Search ............. 84/423, 433, 437, 477 R, 84/478, 479, 485 R

[56] References Cited

U.S. PATENT DOCUMENTS

| | | | |
|---|---|---|---|
| 1,270,657 | 6/1918 | Peters | 84/479 A |
| 2,221,143 | 11/1940 | Lang | 84/478 |
| 3,069,959 | 12/1962 | Foufounis et al. | 84/477 R |

*Primary Examiner*—Lawrence R. Franklin
*Attorney, Agent, or Firm*—Bernard, Rothwell & Brown

[57] ABSTRACT

This specification discloses an improved keyboard for musical instruments in which selected keys (1,3) have indicia (2,4) applied to their exposed surfaces, said indicia (2,4) being formed from ink which is sensitive to ultra-violet radiation, and a low power actinic lamp (5) mounted on the instrument in overlying relationship with the indicia (2,4) on the keys (1,3) so that the indicia (2,4) are visible to a player when illuminated by the lamp (5).

3 Claims, 3 Drawing Figures

KEYBOARD

BACKGROUND OF THE INVENTION

This invention relates to keyboards for musical instruments such as organs and pianos.

It is known, for example from U.S. Pat. No. 3,430,530—Grindinger, to provide selective illumination of a keyboard having indicia within the keys for indicating the notes associated with the respective keys whereby an unskilled player may be assisted in learning the notes while at the same time being able to play a melody from specially prepared music in which the individual notes are designated by their letters. In the arrangement described in the above U.S. patent, the keys are translucent and are embossed with the letters such that on being illuminated internally of the keyboard, the notes are visible to the player. However, when the keyboard is not illuminated, it has the appearance of a standard keyboard.

While the arrangement described above is effective in practice, the keys must be specially manufactured to be sufficiently translucent so that the indicia embossed therein is not visible except when the keyboard is internally illuminated. Similarly, the illuminating means being located under the keyboard is difficult to service, for example in the event that the illuminating means breaks down.

It is the object of the present invention to provide an improved keyboard in which the selective illumination of indicia for the keys may be achieved in a greatly simplified manner.

The invention therefore provides a keyboard for a musical instrument comprising a plurality of keys, at least some of said keys having indicia at the exposed surface of the keys, said indicia being formed from a material which becomes visible when exposed to electromagnetic radiation emitted by an illuminating device arranged to direct said radiation onto at least that portion of the keys having said indicia.

In one preferred form of the invention, the indicia are printed or painted on the exposed surface of the keys in an ink which is sensitive to ultra-violet radiation, said illuminating device comprising a low power actinic lamp secured to the instrument in overlying relationship with said keys to direct ultra-violet radiation onto said indicia. Thus when the lamp(s) are on, the indicia will glow and become visible whereas when the lamp(s) are off, the indicia are invisible so that the keyboard is of standard appearance.

Since the indicia are applied to or formed in the exposed surface of the keys, the illuminating device may be arranged in a much more accessible position than the prior art arrangement described above. Similarly, since the indicia may be applied to the keys by a printing or painting process, it is possible to apply the invention to an existing keyboard simply by fitting an illuminating device in a substantially concealed manner to illuminate the required portion of the keyboard.

In this regard it is preferred that the indicia are applied to the keys adjacent their inner ends so that the illuminating device may be mounted on part of the existing structure of the musical instrument. The arrangement of the indicia in this manner has the added advantage that the indicia are not contacted or covered by the fingers when the keyboard is in use.

Figure 1:
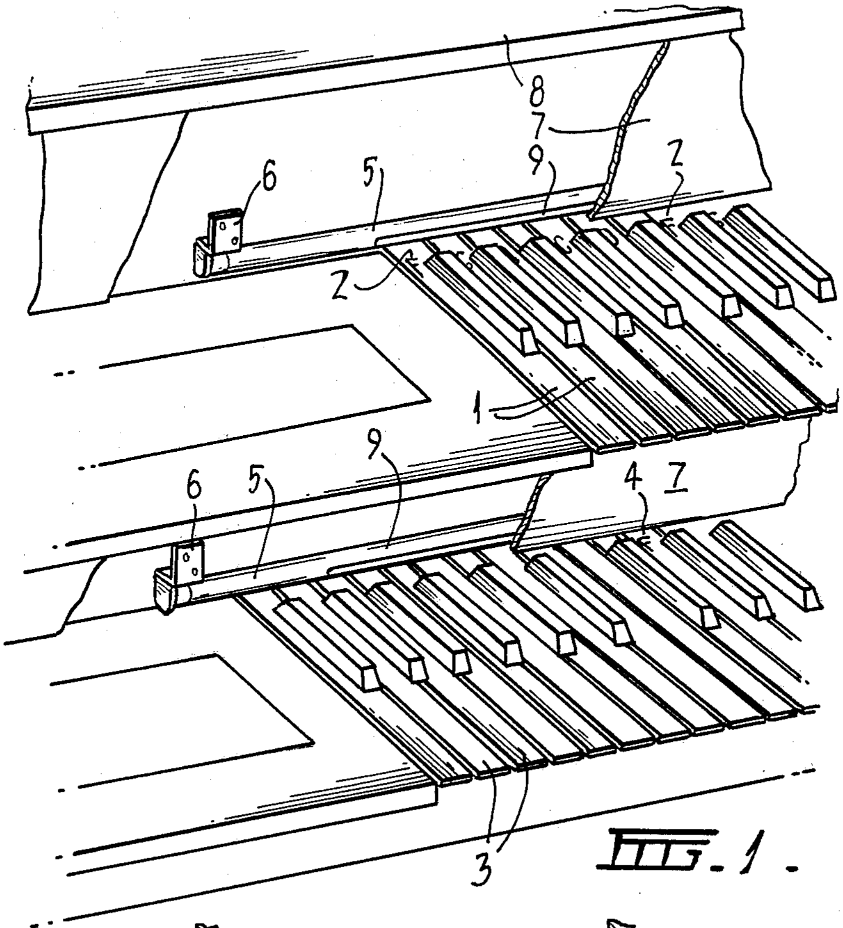
FIG. 1 is a perspective view of the invention, partially broken away to show details of the lamp.
Figure 2:
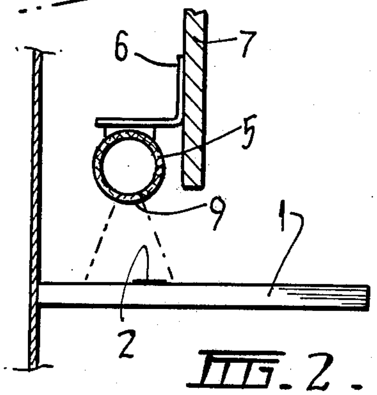
FIG. 2 is a side view of one embodiment of the invention.
Figure 3:
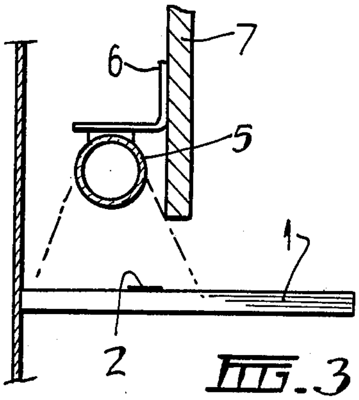
FIG. 3 is a side view of a second embodiment of the invention.

One preferred form of the invention is shown in the accompanying schematic representation of a dual keyboard organ embodying the invention.

In the arrangement shown in the drawing, each of the white keys 1 of the upper keyboard or manual are printed with a letter 2 corresponding to the note played by that key while the white keys 3 of the lower keyboard or manual are printed with letters 4 corresponding to the notes played by those keys in a selected region of the lower keyboard only. The selected region preferably corresponds to the notes commonly used by beginners to play the basic chords associated with simple musical pieces. Of course it will be appreciated that all of the keys on the lower keyboard may be printed with indicia in the same manner as the upper keyboard if this is desired. Similarly, if desired, the black notes may be labelled although this is not preferred because of the dual designation possible for each key.

The letters 2 and 4 are applied to the exposed surface of the keys 1 and 3 by printing or painting in a commercially available optically brightened fluorescent ink which re-emits radiation in the visible spectrum when exposed to ultra-violet radiation. Such inks are widely used by banks to record depositors' signatures in passbooks.

One or more tubular actinic lamps 5 of the type commonly referred to as "black lights" are arranged in closely spaced overlying relationship with the inner ends of the keys of each keyboard and are supplied with the required electrical power from the power supply of the organ. Each lamp 5 is arranged behind a cover plate or fascia panel 7 which is arranged above the keys by a distance which is just sufficient to allow the radiation emitted by the lamps 5 to extend just beyond the letters 2 and 4. A switch (not shown) is provided to selectively activate the lamps 5 as required by the user.

In the case of the lamp 5 for the top keyboard, the lamp 5 is fixed by brackets 6 to the inside of the fascia panel 7 which is also constructed as part of the hinged lift-up top 8 of the organ. Thus, by lifting the hinged top 8, as is possible with the majority of commercially available organs, easy access to the lamp 5 is possible.

In the case of the lower keyboard, the lamp 5 is fixed to a fascia panel 7 which is constructed as part of the top keyboard. Once again, the top keyboard is hinged to the organ structure and access to the lamp 5 is achieved by lifting the top 8 and then lifting the top keyboard.

If desired, the lamps 5 may be covered by paint or by a plastic coating so as to leave a narrow band 9 of exposed lamp in alignment with the indicia 2 and 4. In this way the spacing between the fascia panels 7 and the top and lower keyboards becomes less important since only the desired regions of the keys will be exposed to the radiation.

It will be appreciated from the above that the keyboard arrangement according to the present invention offers quite distinct advantages over the prior art described above. In the first place the indicia may be applied to a new keyboard or to an existing keyboard and does not require any special steps to be taken in the manufacture of the keys. Similarly, in the preferred embodiment of the invention, the lamps used to illuminate the indicia are conveniently positioned for service when required rather than arranged within the musical instrument itself.

While in the preferred embodiment the indicia are printed or painted on to the exposed surfaces of the keys, inserts formed from the required radiation sensitive material may be inset into the keys if this is desired. Similarly, while ultra-violet radiation has been referred to in the preferred embodiment, other radiations which cause the indicia to fluoresce and become visible to the user may be used with equal success.

I claim:

1. A keyboard for a musical instrument comprising a plurality of keys, at least some of said keys having indicia at the exposed surface of the keys, said indicia being formed from a material which becomes visible when exposed to electromagnetic radiation emitted by an illuminating device arranged to direct said radiation onto at least that portion of the keys having said indicia, said indicia being applied to the exposed surface of the keys in an ink which is sensitive to ultra-violet radiation, said illuminating device comprising a low power actinic lamp secured to the instrument in overlying relationship with said keys to direct ultra-violet radiation onto said indicia.

2. The keyboard of lamp 1, wherein said lamp is positioned behind a fascia panel on the instrument which obscures the lamp from view.

3. The keyboard of claim 2, wherein the lamp is covered except for a narrow downwardly directed strip through which a relatively narrow strip of radiation is directed onto said indicia.

* * * * *

UNITED STATES PATENT OFFICE
CERTIFICATE OF CORRECTION

Patent No. 4,322,997 Dated April 6, 1982

Inventor(s) Lawrence George Anstis

It is certified that error appears in the above-identified patent and that said Letters Patent are hereby corrected as shown below:

Column 4, line 11, claim 2, the word "lamp" (first occurrence) should be --claim--.

Signed and Sealed this

*Twenty-second* Day of *June 1982*

[SEAL]

*Attest:*

GERALD J. MOSSINGHOFF

*Attesting Officer* *Commissioner of Patents and Trademarks*